(12) United States Patent
Fujikawa

(10) Patent No.: US 9,007,535 B2
(45) Date of Patent: Apr. 14, 2015

(54) HEAD-UP DISPLAY APPARATUS

(75) Inventor: Takayuki Fujikawa, Nagoya (JP)

(73) Assignee: Denso Corporation, Kariya (JP)

( * ) Notice: Subject to any disclaimer, the term of this patent is extended or adjusted under 35 U.S.C. 154(b) by 227 days.

(21) Appl. No.: 13/585,214

(22) Filed: Aug. 14, 2012

(65) Prior Publication Data
US 2013/0050593 A1 Feb. 28, 2013

(30) Foreign Application Priority Data
Aug. 27, 2011 (JP) .................................. 2011-185379

(51) Int. Cl.
| | |
|---|---|
| G02F 1/1335 | (2006.01) |
| G02B 27/01 | (2006.01) |
| H04N 9/31 | (2006.01) |
| G02B 27/28 | (2006.01) |
| G02B 5/30 | (2006.01) |
| G02B 27/48 | (2006.01) |

(52) U.S. Cl.
CPC .......... *G02B 27/0101* (2013.01); *H04N 9/3197* (2013.01); *G02B 27/283* (2013.01); *G02B 5/30* (2013.01); *G02B 27/48* (2013.01)

(58) Field of Classification Search
CPC ........................... H04N 9/3197; G02B 27/283
USPC ................................................... 349/5, 9, 11
See application file for complete search history.

(56) References Cited

U.S. PATENT DOCUMENTS

| | | | | |
|---|---|---|---|---|
| 5,598,175 | A  * | 1/1997 | Iino ..................................... | 345/7 |
| 6,744,478 | B1 * | 6/2004 | Asakura et al. .................. | 349/11 |
| 6,956,878 | B1 | 10/2005 | Trisnadi | |
| 7,123,418 | B2 * | 10/2006 | Weber et al. ................... | 359/630 |
| 8,184,215 | B2 * | 5/2012 | Osterman et al. ............... | 349/15 |
| 2010/0014054 | A1 | 1/2010 | Lapchuk et al. | |
| 2012/0182487 | A1 | 7/2012 | Konno | |

FOREIGN PATENT DOCUMENTS

| | | |
|---|---|---|
| JP | 2003-521740 | 7/2003 |
| JP | 2010-276742 | 12/2010 |
| WO | 2011/037039 | 3/2011 |
| WO | WO 2011/037039 | 3/2011 |

OTHER PUBLICATIONS

Office action dated Oct. 29, 2013 in corresponding Korean Application No. 10-2012-92895.
Office action dated May 28, 2013 in corresponding Japanese Application No. 2011-185379.
Notification of Reasons for Refusal dated Aug. 20, 2013 in corresponding JP application No. 2011-185379 with English translation.
Office Action dated Jun. 4, 2014 in the corresponding CN application No. 201210304124 with English translation.

* cited by examiner

*Primary Examiner* — Richard Kim
*Assistant Examiner* — Kendrick Hsu
(74) *Attorney, Agent, or Firm* — Harness, Dickey & Pierce, PLC.

(57) ABSTRACT

A beam splitter outputs a light, which includes two polarized light components, when the splitter receives laser lights from laser light sources. The splitter is arranged such that when the light, which is outputted from the splitter and is reflected by or transmitted through a screen, is incident on a projection surface of a windshield, polarization directions of the two polarized light components are different from each other and are not parallel to a plane of incidence, which is formed at a point of incidence of the light on the projection surface.

5 Claims, 5 Drawing Sheets

HEAD-UP DISPLAY APPARATUS

CROSS REFERENCE TO RELATED APPLICATION

This application is based on and incorporates herein by reference Japanese Patent Application No. 2011-185379 filed on Aug. 27, 2011.

TECHNICAL FIELD

The present disclosure relates to a head-up display apparatus.

BACKGROUND

For example, JP2010-26483A (US2010/0014054A1) teaches a display apparatus, which uses a laser light (a coherent light) to project an image onto a screen member. In this display apparatus, two laser lights, which have orthogonal polarization directions, respectively, that are perpendicular to each other, are generated, and these laser lights are projected onto the screen member to produce the image. Since the polarization directions of these two laser lights are perpendicular to each other, it is possible to limit generation of a speckle noise, which is otherwise generated by interference between diffused lights that are diffused by the screen member upon impingement of the laser lights onto the screen member.

This technique is based on that the lights, which have different polarization directions, respectively, do not substantially interfere with each other. When the lights, which have the different polarization directions, respectively, are projected onto the screen member, the speckle noise is reduced. Here, it should be noted that the viewer recognizes the reduction of the speckle noise when both of the two diffused lights, which are diffused on the screen member upon impingement of the two laser lights having the orthogonal polarization directions onto the screen member, are reflected by the screen member to the eye of the viewer.

As discussed above, the viewer can recognize the reduction of the speckle noise since both of the two diffused lights, which are diffused by the screen member upon impingement of the lights having the different polarization directions onto the screen member, are reflected to the eye of the viewer. When a difference between intensities of the diffused lights is large, the effect of reducing the speckle noise may possibly be deteriorated.

When the technique of JP2010-26483A (US2010/0014054A1) is applied to a head-up display apparatus of a vehicle that projects a display image, which is formed on a screen member, onto a display member (e.g., a windshield of the vehicle) to enable visual recognition of a virtual image of the display image by a viewer (driver), the above effect of reducing the speckle noise generated on the screen member may possibly be deteriorated.

The deterioration of the effect of reducing the speckle noise tends to occur when a polarization direction of one of two orthogonally polarized lights is parallel to a plane of incidence on the windshield. In general, when a polarization direction of one light component (i.e., a component of an electric field) is parallel to a plane of incidence, such a light component is referred to as a p-polarized light component. Furthermore, another light component, which is perpendicular to the plane of incidence, is referred to as an s-polarized light component. A reflectance of the p-polarized light component is lower than that of the s-polarized light component. Therefore, the diffused light, which is polarized in the polarization direction of the p-polarized light component, substantially does not reach the eye of the viewer. Thus, even when the laser lights, which have orthogonal polarization directions, respectively, that are perpendicular to each other, are incident on the screen member to reduce the speckle noise, the intensity of the one of the polarized lights, which are diffused and reflected by the screen member and reach the eye of the viewer, may possibly be substantially reduced in comparison to the intensity of the other one of the polarized lights. Thereby, the effect of reducing the speckle noise may possibly be deteriorated. Particularly, when the angle of incidence of the polarized laser light on the windshield is equal to or close to the Brewster's angle, the intensity of the polarized laser light, which has the polarization direction that is equal to the polarization direction of the p-polarized light component (i.e., that is parallel to the plane of incidence of the polarized laser light), may possibly become very small, and thereby the effect of reducing the speckle noise may possibly be largely deteriorated.

SUMMARY

The present disclosure is made in view of the above disadvantage.

According to the present disclosure, there is provided a head-up display apparatus that is adapted to project a display image onto a projection surface of a display member, which is installed in a vehicle, to enable a viewer located in a passenger compartment of the vehicle to view a virtual image of the display image. The head-up display apparatus includes at least one light source device, a polarizing device and a screen member. The at least one light source device is adapted to output a coherent light to form the display image. The polarizing device is placed in a light path of the coherent light, which is outputted from the at least one light source device. The polarizing device outputs a light, which includes first and second polarized light components, when the polarizing device receives the coherent light from the at least one light source device. The screen member reflects or transmits the light, which is outputted from the polarizing device, upon diffusing the light at the screen member to form the display image on the projection surface when the screen member receives the light outputted from the polarizing device. The polarizing device is arranged in the light path such that when the light, which is outputted from the polarizing device and is reflected by or transmitted through the screen member, is incident on the projection surface, a polarization direction of the first polarized light component and a polarization direction of the second polarized light component are different from each other and are not parallel to a plane of incidence, which is formed at a point of incidence of the light on the projection surface.

BRIEF DESCRIPTION OF THE DRAWINGS

The drawings described herein are for illustration purposes only and are not intended to limit the scope of the present disclosure in any way.

DETAILED DESCRIPTION

Figure 1:
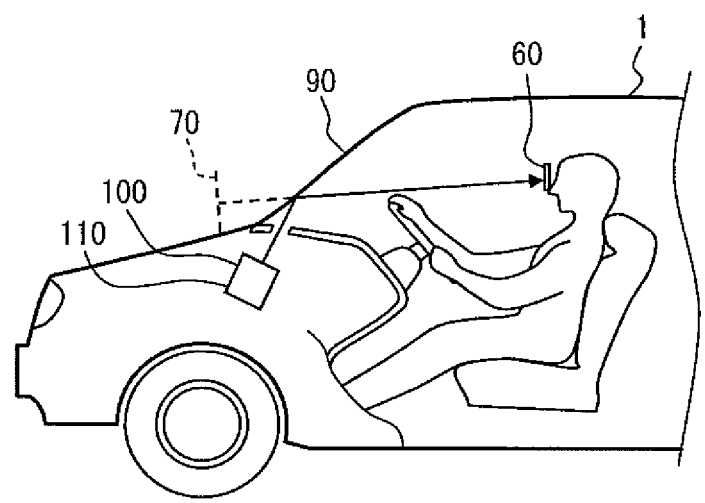
FIG. 1 is a schematic view showing a vehicle, in which a head-up display apparatus according to a first embodiment of the present disclosure is installed.

Various embodiments of the present disclosure will be described with reference to the accompanying drawings. In the following description, similar components will be indicated by the same reference numerals throughout the embodiments and will not be described redundantly for the sake of simplicity.

(First Embodiment)

Figure 2:
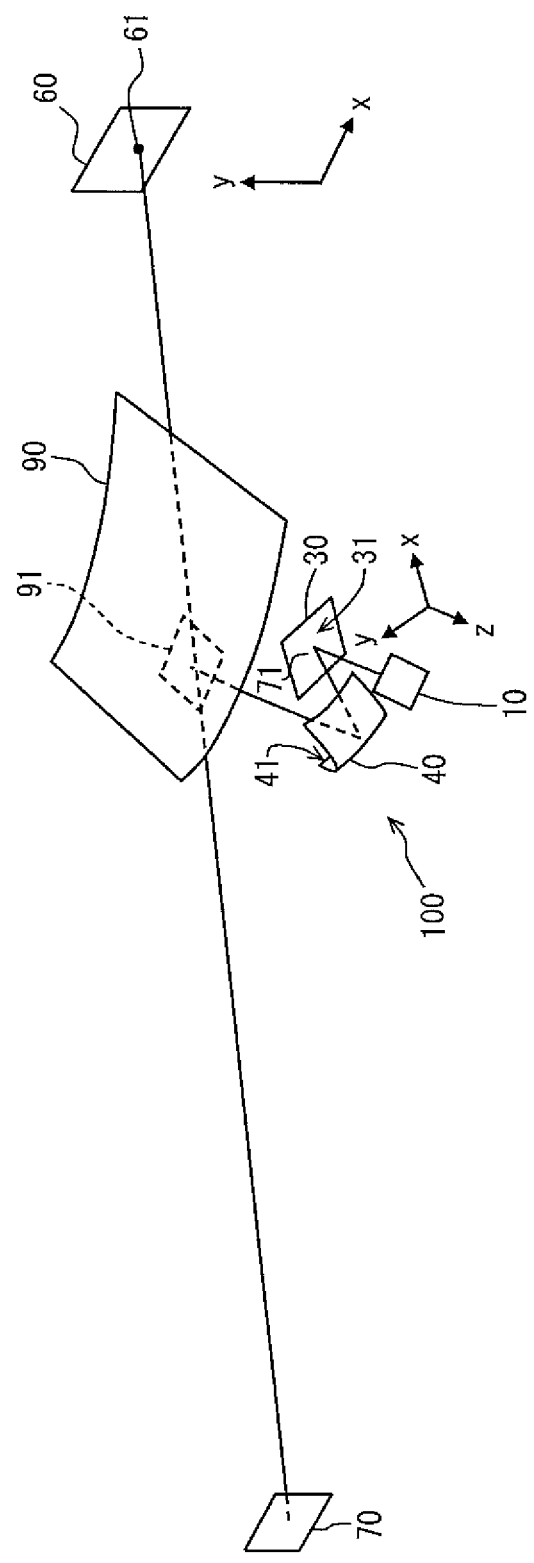
FIG. 2 is a diagram for describing arrangement of a head-up display apparatus in the vehicle according to the first embodiment.
Figure 3:
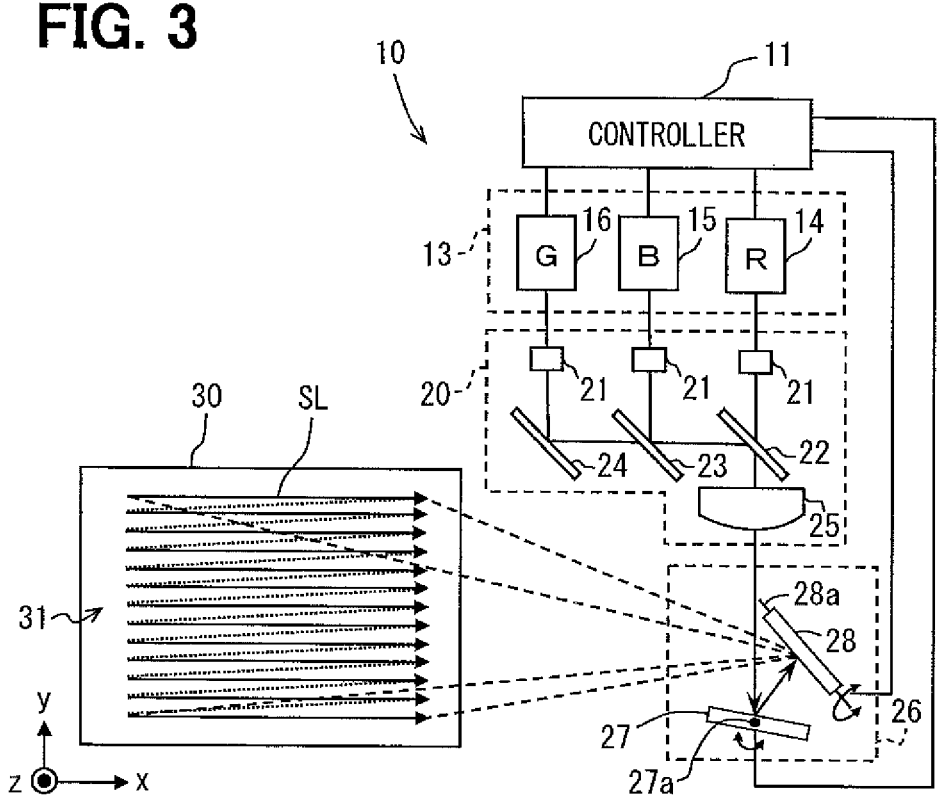
FIG. 3 is a diagram showing a structure of a laser scanner of the first embodiment.

FIG. 1 is a schematic view showing a vehicle, in which a head-up display apparatus of a first embodiment of the present disclosure is installed. FIG. 2 is a diagram for describing arrangement of the head-up display apparatus in the vehicle according to the first embodiment. FIG. 3 is a diagram for describing a structure and an operation of a laser scanner of the first embodiment.

The head-up display apparatus 100 of the first embodiment is received in an instrument panel of the vehicle 1. In the head-up display apparatus 100, a display image 71 is projected onto a display member, such as a windshield 90 of the vehicle 1, so that a viewer (driver) can visually recognize a virtual image 70 of the display image 71 from a preset eye box 60. A projection surface (also referred to as a surface of projection) 91, onto which the display image 71 is projected from the head-up display apparatus 100, is formed in a vehicle interior side surface of the windshield 90 and is formed as a concave surface, which is concave, i.e., is curved and is recessed in a direction away from the viewer (and thereby away from the eye box 60 of the viewer). The light (a bundle of rays) of the display image 71, which is projected onto the projection surface 91, is reflected by the projection surface 91 toward the eye box 60 and reaches an eye point 61 of the viewer. The viewer who perceives the light of the display image 71 can visually recognize, i.e., can view the virtual image 70 of the display image 71, which is formed on the front side of the windshield 90 (i.e., the side of the windshield 90, which is opposite from the viewer). The display image 71 includes image segments indicating, for example, a traveling speed of the vehicle 1 having the head-up display apparatus 100, an image of a traveling direction sign of the vehicle 1, which is specified by the navigation system, and a warning sign(s) of the vehicle 1.

The viewer can visually recognize the virtual image 70 only when the eye point 61 of the viewer is located in the eye box 60. When the eye point 61 is displaced from the eye box 60, it is difficult for the viewer to visually recognize the virtual image 70.

The eye box 60 is an area, in which the eye point 61 is likely placed when the viewer is seated on the driver's seat and takes a proper driving posture on the driver's seat. The eye box 60 is configured into an elongated rectangular form, which is elongated in the horizontal direction rather than in the vertical direction. The reason why the eye box 60 is set to be elongated in the horizontal direction is that the head of the viewer seated on the driver's seat tends to move in the horizontal direction of the vehicle 1 rather than the vertical direction of the vehicle 1.

Now, a structure of the head-up display apparatus 100 will be described with reference to FIGS. 2 and 3. The head-up display apparatus 100 includes a laser scanner 10, a screen 30 and a concave mirror 40, which are received in a housing 110 (FIG. 1). In the following description, an axis of the horizontal direction (also referred to as a lateral direction or a first direction) of the virtual image 70, which is viewed by the viewer, will be referred to as an x-axis. Furthermore, an axis of the vertical direction (also referred to as a top-to-bottom direction or a second direction) of the virtual image 70, which is perpendicular to the horizontal direction, will be referred to as a y-axis. Also, in the following description, for the sake of convenience, the direction of the x-axis of the display image 71, which is formed on or projected onto each corresponding component, will be referred to as the horizontal direction (also referred to as the lateral direction or the first direction), and the direction of the y-axis of the display image 71, which is formed on or projected onto each corresponding component, will be referred to as the vertical direction (also referred to as the top-to-bottom direction or the second direction).

The laser scanner 10 includes a light source 13, an optical device 20, a micro electro mechanical systems (MEMS) device 26 and a controller 11.

The light source 13 includes three laser projecting devices 14-16. Each of the laser projecting devices 14-16 projects a corresponding laser light (also referred to as a laser beam) that has a frequency, which is different from that of the other two of the laser projecting devices 14-16, i.e., the corresponding laser light that has a color phase, which is different from that of the other two of the laser projecting devices 14-16. Specifically, the laser projecting device 14 projects the laser light of a red color. The laser projecting device 15 projects the laser light of a blue color. The laser projecting device 16 projects the laser light of a green color. When the laser lights of the different color phases are additively mixed, various colors can be reproduced. Each laser projecting device 14-16 is connected to the controller 11. Each laser projecting device 14-16 projects the laser light of the corresponding color phase based on a control signal outputted from the controller 11.

The optical device 20 includes three collimator lenses 21, three dichroic filters 22-24 and a condenser lens 25. Each collimator lens 21 is placed on a downstream side of the corresponding laser projecting device 14-16 in the projecting direction of the laser light, which is projected from the laser projecting device 14-16. The collimator lens 21 generates parallel rays of light by bending the laser light.

Each dichroic filter 22-24 is placed on a downstream side of the corresponding collimator lens 21 in the projecting direction of the laser light, which is projected from the corresponding laser projecting device 14-16. The dichroic filter 22, which is placed on the downstream side of the laser projecting device 14, passes the light of the frequency of the red color and reflects the other lights of the other frequencies that are other than the frequency of the red color. The dichroic filter 23, which is placed on the downstream side of the laser projecting device 15, reflects the light of the frequency of the blue color and passes the other lights of the other frequencies that are other than the frequency of the blue color. The dichroic filter 24, which is placed on the downstream side of the laser projecting device 16, reflects the light of the frequency of the green color and passes the other lights of the other frequencies that are other than the frequency of the green color. The green laser light, which is reflected by the dichroic filter 24, and the blue laser light, which is reflected by the dichroic filter 23, are reflected by the dichroic filter 22 and enter the condenser lens 25, and the red laser light, which passes through the dichroic filter 22, is also directed toward the condenser lens 25 and enters the condenser lens 25.

The condenser lens 25 is a plano-convex lens, which has a light input surface formed as a planar surface and a light output surface formed as a convex surface. The condenser lens 25 converges the light by bending the laser light, which enters the light input surface of the condenser lens 25. Thereby, the laser light, which has passed through the condenser lens 25, is focused on an imaging surface 31 of the screen 30, which will be described later, after passing through the MEMS device 26.

The MEMS device 26 is connected to the controller 11 and includes a horizontal scanner 27 and a vertical scanner 28. A metal film is formed on a surface of the horizontal scanner 27, which is opposed to the optical device 20, by vapor deposition of, for example, aluminum to reflect the light. The horizontal scanner 27 is rotatably supported by a rotatable shaft 27a, which extends in the vertical direction, so that the horizontal scanner 27 is rotatable about a rotational axis of the rotatable shaft 27a. The rotatable shaft 27a is rotatably supported by the housing of the laser scanner 10. A drive device is provided to the MEMS device 26 to rotate the rotatable shaft 27a. The drive device drives the rotatable shaft 27a to rotate the same about the rotational axis and thereby to rotate the horizontal scanner 27 based on a drive signal that is outputted from the controller 11.

A metal film is formed on a surface of the vertical scanner 28, which is opposed to the horizontal scanner 27, by vapor deposition of, for example, aluminum to reflect the light. The vertical scanner 28 is rotatably supported by a rotatable shaft 28a, which extends in the horizontal direction, so that the vertical scanner 28 is rotatable about a rotational axis of the rotatable shaft 27a. The rotatable shaft 28a is rotatably supported by the housing of the laser scanner 10. A drive device is provided to the MEMS device 26 to rotate the rotatable shaft 28a. The drive device drives the rotatable shaft 28a to rotate the same about the rotational axis and thereby to rotate the vertical scanner 28 based on a drive signal that is outputted from the controller 11.

With the above-described structure of the MEMS device 26, the horizontal scanner 27 and the vertical scanner 28 are driven based on the drive signals outputted from the controller 11. Thereby, the horizontal scanner 27 is rotated about the rotational axis of the rotatable shaft 27a, and the vertical scanner 28 is rotated about the rotational axis of the rotatable shaft 28a.

The controller 11 is a control device, which includes a processor. The controller 11 outputs the control signal to each laser projecting device 14-16 to blink the laser light like a pulsed light. In addition, the laser controller 11 outputs the drive signals to the MEMS device 26 to control the direction of the reflected laser light, which is reflected by the horizontal scanner 27 and the vertical scanner 28, such that the reflected laser light, which is reflected by the horizontal scanner 27 and the vertical scanner 28, forms a scanning line SL shown in FIG. 3.

The controller 11 controls the laser scanner 10 such that the laser scanner 10 projects the light, which forms the display image 71 on the imaging surface 31 of the screen 30. Specifically, by scanning the projected blinking laser light, the display image 71, each pixel of which is formed by the corresponding blinking laser light, is formed on the imaging surface 31 of the screen 30. The display image 71, which is formed by the scanning of the laser scanner 10, is an image that has, for example, 60 frames per second and 480 pixels in the horizontal direction (the x-axis) and 240 pixels in the vertical direction (the y-axis).

The screen 30 is a reflective screen (a screen of a reflective type), which is formed by, vapor deposition of, for example, aluminum on a surface of a substrate made of, for example, glass. The screen 30 diffuses and reflects the received light at a predetermined angle. The screen 30 is placed on the upper side of the laser scanner 10 in the vertical direction of the vehicle 1 (see FIG. 2). The screen 30 has the imaging surface 31. The imaging surface 31 is formed by a metal film of, for example, aluminum that is vapor deposited on the screen 30. The display image 71 is formed on the imaging surface 31 when the laser light is projected from the laser scanner 10 along a y-z plane, which is defined by the y-axis and a z-axis (see FIGS. 3 and 4). The imaging surface 31 has microasperities to diffuse the laser light. The imaging surface 31 diffuses and reflects the laser light, which forms the display image 71 and impinges on the imaging surface 31, toward the concave mirror 40.

Here, it should be noted that although the screen 30 is formed as the reflective screen in this instance, the screen 30 may be alternatively formed as a transmission screen, which is made of a light transmissive material, and the imaging surface 31, which has the micro-asperities, is formed as a transmissive surface that transmits the light therethrough. In such a case, the laser scanner 10 projects the laser light, which forms the display image 71, from the opposite side of the screen 30, which is opposite from the concave mirror 40, and the screen 30 diffuses and transmits the projected laser light therethrough toward the projection surface 91 of the windshield 90 through the concave mirror 40 to form the display image 71 on the projection surface 91.

The concave mirror 40 is formed through vapor deposition of, for example, aluminum on a surface of a substrate made of, for example, glass. The concave mirror 40 has a reflection surface 41 that reflects the reflected laser light, which is reflected from the imaging surface 31 of the screen 30, onto the projection surface 91 of the windshield 90. A center portion of the reflection surface 41 is concave, i.e., is curved and is recessed in a direction away from the imaging surface 31 and the projection surface 91. The reflection surface 41 projects the display image 71 on the projection surface 91 such that the reflection surface 41 enlarges and reflects the display image 71, which is reflected by the imaging surface 31.

Figure 4:
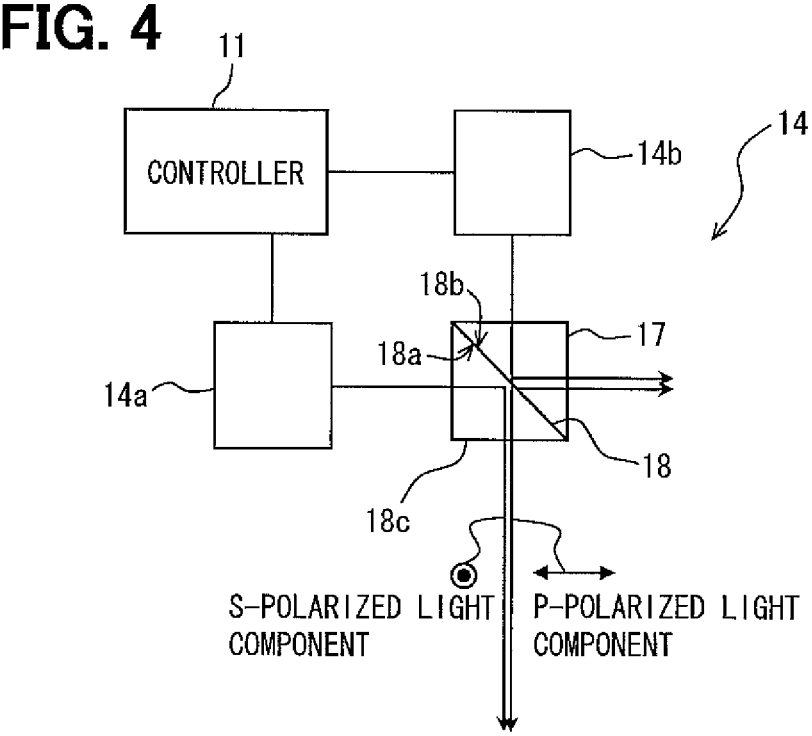
FIG. 4 is a diagram showing a structure of a laser projecting device of the head-up display apparatus according to the first embodiment.

Next, characteristic features of the head-up display apparatus 100 of the first embodiment will be described. First of all, the structure of the respective laser projecting devices 14 to 16 will be described. FIG. 4 is a diagram showing a structure of the laser projecting device 14. Although FIG. 4 shows only the laser projecting device 14, the structure of each of the other two laser projecting devices 15, 16 is the same as that of the laser projecting device 14 and thereby will not be described here for the sake of simplicity.

As shown in FIG. 4, the laser projecting device 14 has a first laser light source 14a, a second laser light source 14b and a polarizing beam splitter 17. Each of the first laser light source 14a and the second laser light source 14b is connected to the controller 11 and projects the laser light in response to a control signal received from the controller 11. The laser light, which is projected from the first laser light source 14a, is a light having a plurality of predetermined polarization directions and is inputted into the polarizing beam splitter 17. Similarly, the laser light, which is projected from the second laser light source 14b, is a light having a plurality of predetermined polarization directions and is inputted into the polarizing beam splitter 17. The first laser light source 14a and the second laser light source 14b are arranged such that the laser light of the first laser light source 14a and the laser light of the second laser light source 14b are generally perpendicular to each other at the polarizing beam splitter 17.

The polarizing beam splitter 17 is placed on the light path of the laser light, which is outputted from the first laser light source 14a, and also on the light path of the laser light, which is outputted from the second laser light source 14b. The laser light of the first laser light source 14a and the laser light of the second laser light source 14b are inputted into the polarizing beam splitter 17 and are outputted from the polarizing beam splitter 17 after mixing of a p-polarized light component and an s-polarized light component of the laser lights of the first and second laser light sources 14a, 14b, which will be discussed in detail below. Thereby, the polarizing beam splitter 17 projects the laser light, which has the two polarized light components (the p-polarized light component and the s-polarized light component) in a predetermined direction toward the collimator lens 21, and the polarization directions of these two polarized light components are perpendicular (orthogonal) to each other. The laser light, which is projected from the polarizing beam splitter 17 of the laser projecting device 14, is inputted onto the screen 30 after passing through the collimator lens 21, the dichroic filter 22, the condenser lens 25 and the MEMS device 26.

Now, the polarizing beam splitter 17 will be described in detail. The polarizing beam splitter 17 is made of, for example, glass and is configured into a cube form. The polarizing beam splitter 17 has a filter 18 in a center portion of the polarizing beam splitter 17. The filter 18 extends diagonally in the polarizing beam splitter 17 in the plane of FIG. 4. The filter 18 is made of a dielectric multilayer film and splits the inputted laser light into the p-polarized light component and the s-polarized light component, as described in detail below. The filter 18 has a first surface 18a and a second surface 18b, which are opposed to each other in a direction perpendicular to a plane of the first surface 18a and a plane of the second surface 18b.

At the filter 18, when the laser light is projected from the first laser light source 14a and enters (i.e., is incident on) the first surface 18a of the filter 18, the first surface 18a reflects the s-polarized light component, which has a polarization direction perpendicular to a plane of incidence (the plane of FIG. 4 in this particular instance) at a point of incidence of the laser light on the first surface 18a, and the first surface 18a passes the p-polarized light component, which has a polarization direction parallel to the plane of incidence, to the second surface 18b to transmit the p-polarized light component through the filter 18. In the present embodiment, the first laser light source 14a is, for example, a semiconductor laser (laser diode), and a majority, i.e., more than fifty percent (or nearly all) of the laser light outputted from the first laser light source 14a is polarized in a polarization direction, which corresponds to the polarization direction of the s-polarized light component that is reflected by the first surface 18a, and the rest of the laser light outputted from the first laser light source 14a is polarized in a polarization direction, which corresponds to the polarization direction of the p-polarized light component that passes through the filter 18 from the first surface 18a to the second surface 18b.

Furthermore, at the filter 18, when the laser light is projected from the second laser light source 14b and enters the second surface 18b of the filter 18, the second surface 18b reflects the s-polarized light component, which has a polarization direction perpendicular to a plane of incidence (the plane of FIG. 4 in this particular instance) at a point of incidence of the laser light on the second surface 18b, and the second surface 18b passes the p-polarized light component, which has a polarization direction parallel to the plane of incidence, to the first surface 18a to transmit the p-polarized light component through the filter 18. In the present embodiment, the second laser light source 14b is, for example, a semiconductor laser (laser diode), and a majority, i.e., more than fifty percent (or nearly all) of the laser light outputted from the second laser light source 14b is polarized in a polarization direction that corresponds to the polarization direction of the p-polarized light component that is transmitted through the filter 18 from the second surface 18b to the first surface 18a, and the rest of the laser light outputted from the second laser light source 14b is polarized in a polarization direction, which corresponds to the polarization direction of the s-polarized light component that is reflected by the second surface 18b. In the present embodiment, the same type of semiconductor laser (laser diode) is used as the first and second laser light sources 14a, 14b. The orientation of the first laser light source 14a relative to the polarizing beam splitter 17 is changed from the orientation of the second laser light source 14b relative to the polarizing beam splitter 17 to implement the above-described polarization directions of the first and second laser light sources 14a, 14b.

The s-polarized light component and the p-polarized light component are combined at an exit surface (outlet) 18c of the polarizing beam splitter 17 and are projected from the exit surface 18c along the common optical axis in the common direction. Thereby, the light, which is projected, i.e., outputted from the exit surface 18c, has the two polarized light components, and the polarization directions of these two polarized light components are perpendicular (orthogonal) to each other. Then, this light, which is projected from the exit surface 18c, enters the screen 30. A light intensity (also referred to as a brightness or an output power) of the s-polarized light component and a light intensity of the p-polarized light component are generally equal to each other. The polarization direction of the s-polarized light component and the polarization direction of the p-polarized light component are perpendicular to each other, so that the s-polarized light component and the p-polarized light component do not substantially interfere with each other. Since the terms of the s-polarized light component and the p-polarized light component are defined in view of the plane of incidence on the first surface 18a or the second surface 18b of the filter 18, the s-polarized light component and the p-polarized light component of the light outputted from the exit surface 18c of the polarizing beam splitter 17 will be discussed as the two polarized light components (or first and second polarized light components) of the light in the following discussion unless otherwise stated.

The light, which is projected from the polarizing beam splitter 17 and has the two polarized light components having the polarization directions perpendicular to each other, enters the screen 30 and is diffused. The light (diffused light), which is diffused and is reflected by the imaging surface 31 of the screen 30, enters the reflection surface 41 of the concave mirror 40 while maintaining the polarization directions of the two polarized light components thereof. The diffused light, which is reflected by the reflection surface 41, enters, i.e., is incident on the projection surface 91 of the windshield 90 while maintaining the polarization directions of the two polarized light components thereof. Thereafter, a portion of the diffused light, which enters the projection surface 91, is reflected by the projection surface 91 and reaches the eye point 61 of the viewer.

When the light, which has the two polarized light components having the polarization direction perpendicular to each other, is diffused at the imaging surface 31 of the screen 30, the speckle noise is reduced by the diffused light, which is diffused at the imaging surface 31, since the two polarized light components having the polarization directions perpendicular to each other do not substantially interfere with each other. Here, it should be noted that this effect of reducing the speckle noise is manifested when the diffused light reaches the eye (the eye point 61) of the viewer, and this effect of reducing the speckle noise is not manifested when the diffused light does not reach the eye point 61. Furthermore, the effect of reducing the speckle noise is deteriorated when a difference between the light intensities of the two polarized light components of the diffused light reached to the eye point 61 is increased.

In the present embodiment, there is a factor that limits the reaching the diffused light, which is diffused and is reflected by the screen 30, to the eye point 61. Specifically, the projection surface 91 of the windshield 90 is the factor that possibly limits the reaching of the diffused light to the eye point 61 of the viewer. This point will now be described in detail.

Figure 5:
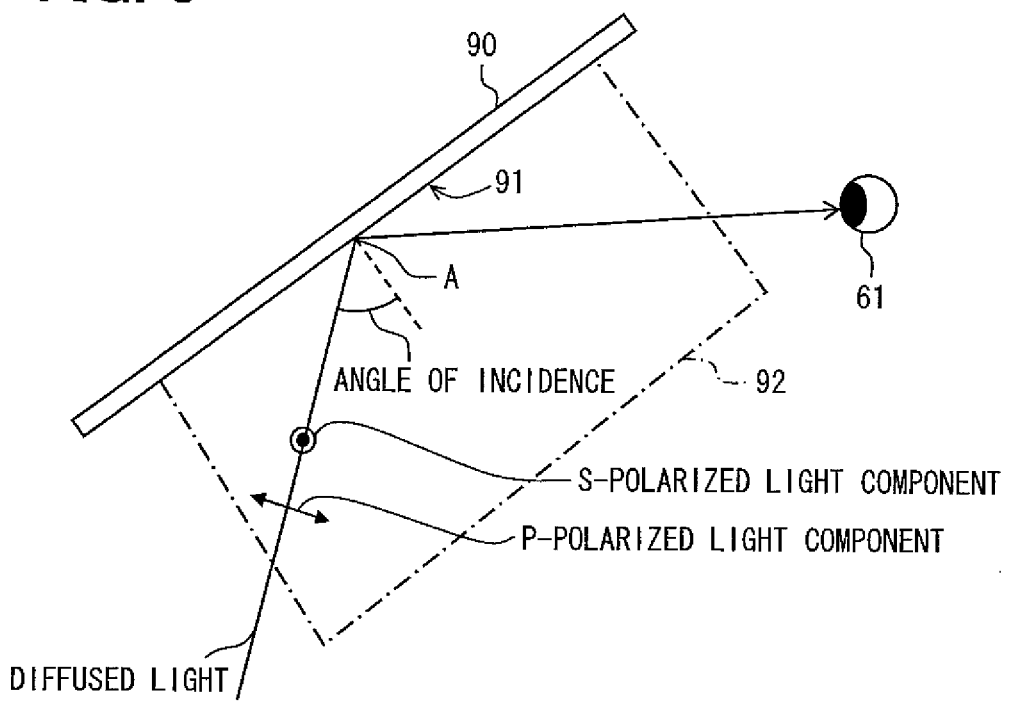
FIG. 5 is a diagram showing a relationship between incidence of a diffused light and reflection of the diffused light at a projection surface of a windshield in a comparative example.
Figure 6:
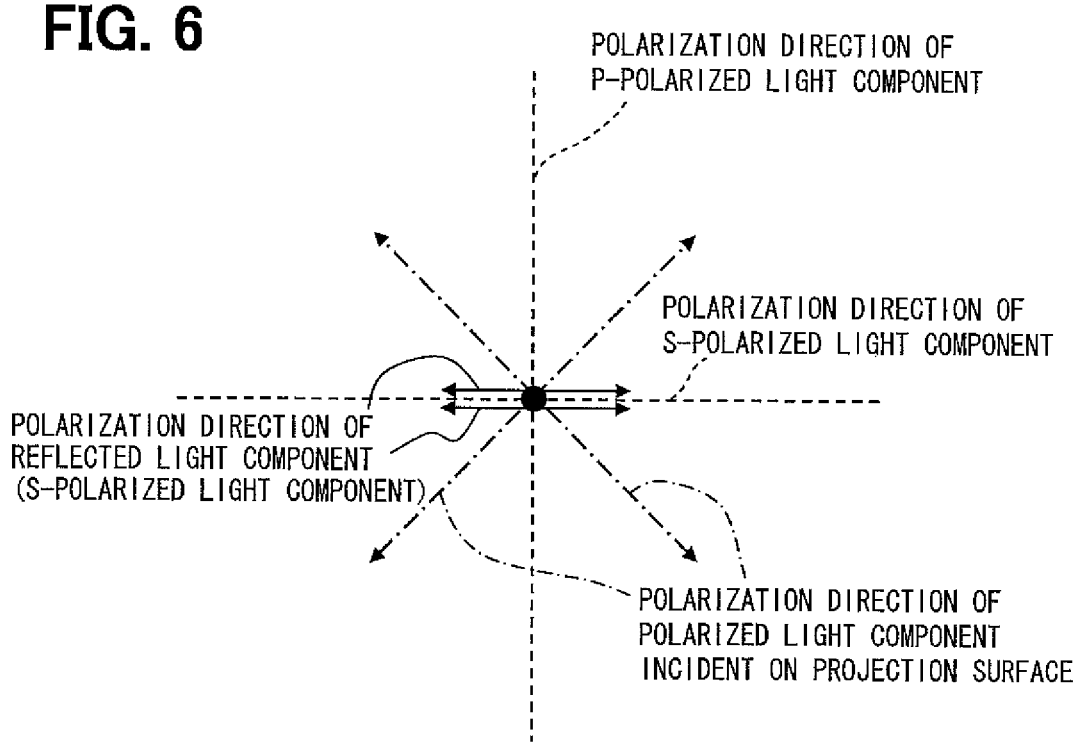
FIG. 6 is a diagram showing polarization directions of polarized light components of a diffused light, which is incident on the projection surface, according to the first embodiment.
Figure 7:
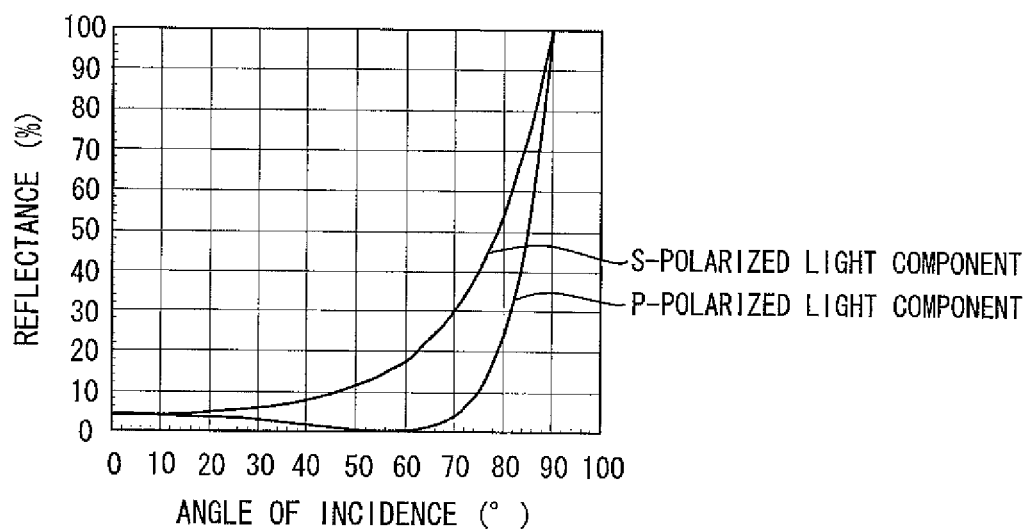
FIG. 7 is a diagram showing a relationship between an angle of incidence and a reflectance for each of an s-polarized light component and a p-polarized light component at the projection surface.

First of all, the incident (entry) and the reflection (exit) of the diffused light at the projection surface 91 of the windshield 90 will be described in detail. FIG. 5 is a diagram showing the incident and the reflection of the diffused light at the projection surface 91 of the windshield 90 in a comparative example. FIG. 6 is a diagram showing the polarization directions of the two polarized light components of the diffused light, which is reflected by the screen 30 and the concave mirror 40 and is incident on the projection surface 91. FIG. 6 also shows the polarization direction of the s-polarized light component shown in FIG. 5 upon the reflection of the s-polarized light component on the projection surface 91. FIG. 7 is a diagram showing a relationship between an angle of incidence and a reflectance for each of the s-polarized light component and the p-polarized light component at the projection surface 91.

Now, with reference to FIG. 5, there will be discussed the comparative example where the diffused light, which is reflected by the concave mirror 40, is incident on a point A of the projection surface 91 at a predetermined angle of incidence and is thereafter reflected by the projection surface 91 toward the eye point 61. In this comparative example, for the descriptive purpose, it is assumed that the diffused light has the s-polarized light component and the p-polarized light component, which are defined with respect to the plane 92 of incidence formed at the point A of incidence of the light on the projection surface 91. The diffused light, which is incident on the projection surface 91, and the diffused light, which is reflected by the projection surface 91, are transmitted along the plane 92 of incidence, which is indicated by a dot-dash line in FIG. 5. The plane 92 of incidence is a plane that includes the point of incidence (point A) of the diffused light on the projection surface 91, an optical axis of this diffused light and a normal line to the projection surface 91 on the point A of incidence. The p-polarized light component shown in FIG. 5 is the polarized light component, which has the polarization direction that is parallel to the plane 92 of incidence (the plane of FIG. 5 in this particular instance). Furthermore, the s-polarized light component shown in FIG. 5 is the polarized light component, which has the polarization direction that is perpendicular to the plane 92 of incidence.

When the diffused light is incident on the point A of the projection surface 91, the intensity of the light component, which is reflected by the projection surface 91 at the point A, is determined according to the graph of FIG. 7, which indicates the relationship between the angle of incidence and the reflectance. For example, in the case where the angle of incidence is equal to the Brewster's angle (about 56 degrees), the p-polarized light component is transmitted through the windshield 90, and only the s-polarized light component is reflected by the windshield 90. The intensity of the s-polarized light component becomes the corresponding intensity, which corresponds to the reflectance of the s-polarized light component shown in FIG. 7.

In the present embodiment, as indicated by dot-dash lines in FIG. 6, the polarization directions of the two polarized light components of the light, which is reflected by the screen 30 and the concave mirror 40 and is incident on the projection surface 91, are perpendicular to each other. Furthermore, the polarization directions of the two polarized light components (see dot-dash lines in FIG. 6) are rotationally displaced by about 45 degrees from the polarization directions of the p-polarized light component and the s-polarized light component of the light shown in and discussed with reference to FIG. 5. In other words, the polarization directions of the two polarized light components of the present embodiment are rotationally displaced by about 45 degrees from the plane 92 of incidence (see the polarization direction of the p-polarized light component shown in FIG. 6) and a plane (see the polarization direction of the s-polarized light component shown in FIG. 6) perpendicular to the plane 92 of incidence. In FIG. 6, the direction of each of two double-sided arrow signs indicates the polarization direction of the corresponding one of the two polarized light components of the present embodiment, and a length of the double-sided arrow sign indicates an amplitude of the light wave of the corresponding one of the two polarized light components of the present embodiment. A value, which is proportional to a square of the amplitude, is the intensity of the light. Therefore, when the length of the double-sided arrow sign is increased, the intensity of the corresponding polarized light component is increased.

When the diffused light of FIG. 5 is incident on the projection surface 91 at the Brewster's angle, the reflectance of the p-polarized light component becomes substantially zero (see FIG. 7). Therefore, in such a case, the diffused light, which is reflected by the projection surface 91, has generally only the polarization direction of the s-polarized light component along the plane 92 of incidence (see solid double-sided arrow signs in FIG. 6). The diffused light of FIG. 5, which is reflected by the projection surface 91, reaches the eye point 61. The intensity of the diffused light of FIG. 5, which is reflected by the projection surface 91, becomes a value, which corresponds to the reflectance of the s-polarized light component shown in FIG. 7.

In the present embodiment, when the diffused light, which has the two polarized light components, is reflected by the projection surface 91, both of the two polarized light components of the diffused light still reach the eye point 61 unlike the comparative example of FIG. 5, in which only the s-polarized light component of the diffused light reaches the eye point 61. In the present embodiment, this is made possible through the setting of the orientation and configuration of the polarizing beam splitter 17 and/or the setting of the orientation and configuration of at least one of the components of the head-up display apparatus 100, which are discussed above and are located between the polarizing beam splitter 17 and the projection surface 91 of the windshield. Therefore, according to the present embodiment, it is possible to limit the deterioration of the effect of reducing the speckle noise, i.e., it is possible to effectively limit the speckle noise. Furthermore, in the present embodiment, with reference to FIG. 6, the intensities of the two polarized light components of the diffused light are generally equal to each other, and thereby there is no substantial difference between the intensities of the two polarized light components. Therefore, it is possible to limit the deterioration of the effect of reducing the speckle noise, i.e., it is possible to effectively limit the speckle noise.

In the present embodiment, as shown in FIG. 6, the polarization directions of the two polarized light components are different from the polarization direction of the p-polarized light component of FIG. 5, which has the lower reflectance in comparison to that of the s-polarized light component at the projection surface 91. Therefore, it is possible to limit an increase in the difference between the intensities of the two polarized light components of the diffused light, which is reflected by the projection surface 91. In a case where the angle of incidence of the diffused light is equal to the Brewster's angle, and the polarization direction of one of the two polarized components of the diffused light coincides with the polarization direction of the p-polarized light component of FIG. 5, this one of the two polarized components of the diffused light does not substantially reach the eye point 61. Therefore, in such a case, the difference between the intensities of the two polarized light components of the diffused light reached to the eye point 61 becomes very large, and thereby the effect of reducing the speckle noise is substantially reduced, like in the comparative example of FIG. 5. When the polarization directions of both of the two polarized light components of the diffused light incident on the projection surface 91 are different from the polarization direction of the p-polarized light component shown in FIG. 5, the difference between the intensities of the two polarized light components is reduced. Thereby, it is possible to limit the deterioration of the effect of reducing the speckle noise, i.e., it is possible to effectively limit the speckle noise.

With reference to the graph of FIG. 7, It is understood that the intensities of the polarized light components of the diffused light, which is reflected by the projection surface 91, vary depending on the polarization directions of the polarized light components of the diffused light, which is incident on the projection surface 91. Furthermore, as shown in FIG. 7, the reflectance of the s-polarized light component is higher than the reflectance of the p-polarized light component. Therefore, the intensity of the polarized light component of the diffused light, which is reflected by the projection surface 91, becomes maximum when the polarization direction of the polarized light component coincides with the polarization direction of the s-polarized light component of FIG. 5. For instance, in a case where the polarization direction of one of the two polarized light components coincides with the polarization direction of the s-polarized light component shown in FIG. 5, the polarization direction of the other one of the two polarized light components is different from the polarization direction of the s-polarized light component shown in FIG. 5. Therefore, in such a case, the intensities of the two polarized light components are consequently different from each other, and thereby there is the substantial difference between the intensities of the two polarized light components of the diffused light.

In the present embodiment, both of the polarization directions of the two polarized light components of the diffused light, which is incident on the projection surface 91, are different not only from the polarization direction of the p-polarized light shown in FIG. 5 but also from the polarization direction of the s-polarized light shown in FIG. 5. Therefore, it is possible to limit the generation of the substantial difference between the intensities of the two polarized light components of the diffused light, which is reflected by the projection surface 91. As a result, it is possible to limit the deterioration of the effect of reducing the speckle noise, i.e., it is possible to effectively limit the speckle noise caused by the substantial difference between the intensities of the two polarized light components of the diffused light, which is reflected by the projection surface 91.

Furthermore, in the present embodiment, the polarization directions of the two polarized light components are symmetrical to each other about the polarization direction of the p-polarized light component shown in FIG. 5, i.e., are symmetrical to each other about the plane 92 of incidence. With the above setting of the polarization directions of the two polarized light components of the diffused light, the intensities of the two polarized light components become substantially equal to each other. Therefore, since the intensities of the two polarized light components of the diffused light become substantially equal to each other, it is possible to limit the deterioration of the effect of reducing the speckle noise, i.e., it is possible to effectively limit the speckle noise.

Here, in the case of the present embodiment where the polarization directions of the two polarized light components of the light, which is incident on the screen 30, are set to be perpendicular to each other, the polarization directions of the two polarized light components are angularly most distantly spaced from each other. Thereby, the effect of reducing the speckle noise can be maximized. In the present embodiment, the polarization directions of the two polarized light components of the light projected from the polarizing beam splitter 17 are set to be perpendicular to each other, and this light is projected onto the imaging surface 31 of the screen 30. Thereby, the effect of reducing the speckle noise can be maximized.

Furthermore, in the present embodiment, the two polarized light components having the polarization directions perpendicular to each other are generated by the separating function (the splitting function) of the filter 18 of the polarizing beam splitter 17. The filter 18 separates the s-polarized light component from the laser light of the first laser light source 14a and also separates the p-polarized light component from the laser light of the second laser light source 14b. Then, the polarizing beam splitter 17 combines and projects the s-polarized light component and the p-polarized light component, which are separated by the filter 18, from the exit surface 18c of the polarizing beam splitter 17 in the common direction. In this way, there is generated the light that includes the two polarized light components having the polarization directions perpendicular to each other. Furthermore, regardless of the polarization directions of the laser light of the first laser light source 14a and the polarization directions of the laser light of the second laser light source 14b, the polarization directions of the two polarized light components, which are projected from the exit surface 18c, become perpendicular to each other.

In the present embodiment, the first laser light source 14a and the second laser light source 14b may serve as light source devices (a plurality of light source devices). Furthermore, the first laser light source 14a may serve as a first light source device, and the second laser light source 14b may serve as a second light source device. Furthermore, the screen 30 may serve as a screen member (screen means). The polarizing beam splitter 17 may serve as a polarizing device (polarizing means).

(Second Embodiment)

Figure 8A:
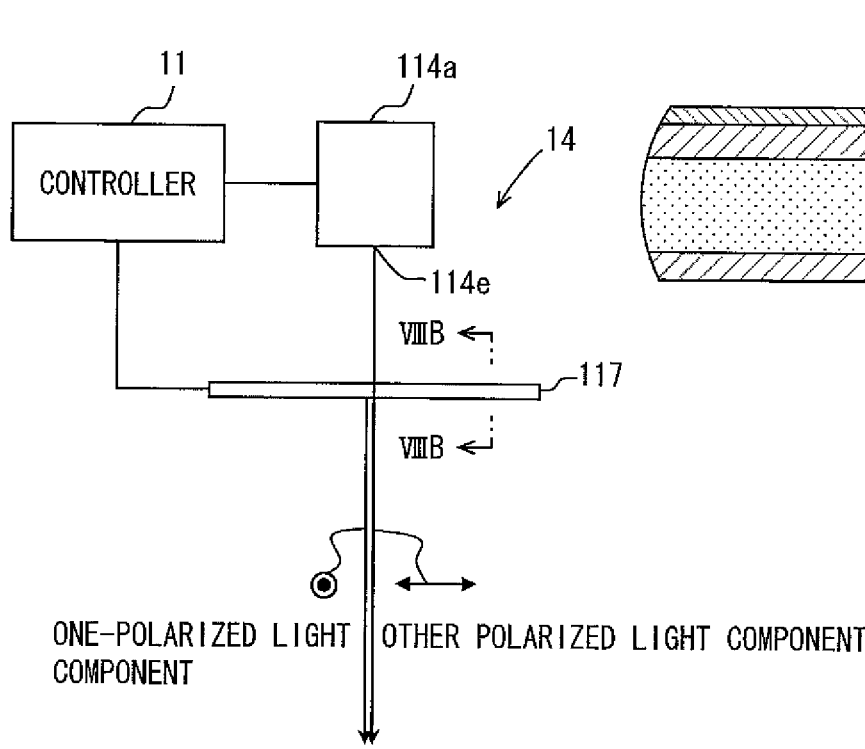
FIG. 8A is a diagram showing a structure of a laser projecting device of a head-up display apparatus according to a second embodiment of the present disclosure.
Figure 8B:
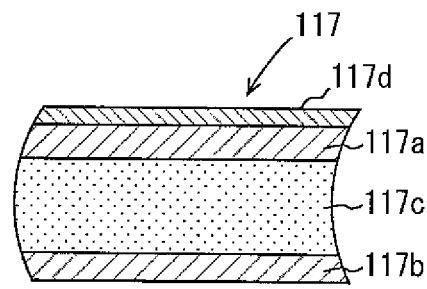
FIG. 8B is an enlarged cross-sectional view taken along line VIIIB-VIIIB in FIG. 8A showing a cross section of a liquid crystal cell device of the laser projecting device of the second embodiment.

In the first embodiment, the polarizing beam splitter 17 is used as the polarizing device (polarizing means). Alternatively, a liquid crystal cell device 117 may be used as the polarizing device. Hereinafter, the second embodiment will be described in detail with reference to FIGS. 8A and 8B. FIG. 8A is a diagram schematically showing a structure of a laser projecting device 14 of the head-up display apparatus of the second embodiment, and FIG. 8B is an enlarged cross-sectional view of the liquid crystal cell device 117 taken along line VIIIB-VIIIB in FIG. 8A.

In the present embodiment, the laser projecting device 14 includes a laser light source 114a and the liquid crystal cell device 117. The structure of each of the other two laser projecting devices 15, 16 is the same as that of the laser projecting device 14 and thereby will not be described here for the sake of simplicity. The laser light source 114a is similar to the first and second laser light sources 14a, 14b of the first embodiment. Therefore, the laser light source 114a is, for example, a semiconductor laser (laser diode), and a majority, i.e., more than fifty percent (or nearly all) of the laser light outputted from the laser light source 114a is polarized in a polarization direction, which corresponds to one of the two polarized light components having the polarization directions perpendicular to each other discussed in the first embodiment, and the rest of the laser light outputted from the laser light source 114a is polarized in a polarization direction, which corresponds to the other one of the two polarized light components having the polarization directions perpendicular to each other. The liquid crystal cell device 117 is a twisted nematic (TN) liquid crystal cell device. In the TN liquid crystal cell device 117, a space, which is defined between an upstream side glass substrate 117a and a downstream side glass substrate 117b arranged one after another in a transmission direction of the light, is filled with liquid crystal molecules to form a layer (liquid crystal molecule layer) 117c of the liquid crystal molecules.

Furthermore, in the liquid crystal cell device 117, a polarizing filter 117d is provided on an upstream side of the upstream side glass substrate 117a where the laser light source 114a is located. The polarizing filter 117d passes only one of the two polarized light components outputted from the laser light source 114a and blocks the other one of the two polarized light components outputted from the laser light source 114a. In this instance, the polarizing filter 117d is set to pass the majority of the laser light outputted from the laser light source 114a that is polarized in the polarization direction, which corresponds the one of the two polarized light components, and the polarizing filter 117d is set to block the rest of the laser light outputted from the laser light source 114a that is polarized in the polarization direction, which corresponds to the other one of the two polarized light components. Thereby, only the one of the two polarized light components outputted from the laser light source 114a enters the upstream side glass substrate 117a through the polarizing filter 117d.

In the TN liquid crystal cell device 117, when an electric power is not supplied to electrodes provided to the glass substrates 117a, 117b, respectively, to have a voltage less than a threshold voltage (deenergized state of the liquid crystal cell device 117), the orientation of the liquid crystal molecules is twisted by 90 degrees between the glass substrates 117a, 117b. When the electric power is supplied to the electrodes of the glass substrates 117a, 117b to have a voltage equal to or higher than the threshold voltage (energized state of the liquid crystal cell device 117), the twist of the orientation of the liquid crystal molecules disappears in the layer 117c of the liquid crystal molecules. The controller 11 controls the energization and the deenergization of the liquid crystal cell device 117.

Therefore, when the liquid crystal cell device 117 is energized by the command signal supplied from the controller 11, the one of the two polarized light components, which is outputted from the laser light source 114a and has passed through the polarizing filter 117d, enters the upstream side glass substrate 117a, and this polarized light component is transmitted through the layer 117c of liquid crystal cell molecules and the downstream side glass substrate 117b while maintaining the original polarization direction of the light. Thus, this polarized light component is outputted from the liquid crystal cell device 117 without changing the orientation of the polarization direction thereof. Furthermore, when the liquid crystal cell device 117 is deenergized by the command signal supplied from the controller 11, the one of the two polarized light components, which is outputted from the laser light source 114a and has passed through the polarizing filter 117d, enters the upstream side glass substrate 117a, and this polarized light component is transmitted through the layer 117c of the liquid crystal molecules upon being rotated by 90 degrees. Then, this polarized light component, which is rotated by 90 degrees, is outputted from the downstream side glass substrate 117b. Thereby, when the energization and the deenergization of the liquid crystal cell device 117 are alternately repeated, the light, which has the two polarized light components having the polarization directions perpendicular to each other, can be projected from the liquid crystal cell device 117. That is, when this liquid crystal cell device 117 is used, the light, which has the two polarized light components having the polarization directions perpendicular to each other, can be projected from the liquid crystal cell device 117 while using the single laser light source 114a.

In the present embodiment, the controller 11 alternately and repeatedly executes the energization and the deenergization of the liquid crystal cell device 117 at predetermined intervals. The humans cannot recognize a visual stimulus, which changes fast within a short time period that is shorter than a predetermined time period. This predetermined time period is set be shorter than a time period, equal to or longer than which the humans can recognize the visual stimulus. The predetermined time period is set to be, for example, equal to or less than one twenty second (1/20 second). In the case where the predetermined time period is set based on the above discussion, even when the polarization direction of the light is periodically switched by the time-division method, the viewer recognizes the resultant projected light as the light having the two polarized light components, which respectively have the polarization directions perpendicular to each other and are transmitted along a common optical axis.

The present disclosure has been described with respect to the first and second embodiments. However, the present disclosure is not limited to the above embodiments, and the above embodiments may be modified within a spirit and scope of the present disclosure.

For instance, in the first and second embodiments, the projected light, which is projected from the polarizing beam splitter 17 or the liquid crystal cell device 117, is the light, which has the two polarized light components that respectively have the polarization directions perpendicular to each other. However, it is not required to have the polarization directions, which are perpendicular to each other. That is, the polarization directions may be changed to any other directions, which are not perpendicular to each other, as long as the polarization directions differ from each other and are not parallel to the plane of incidence.

In the first embodiment, the polarizing beam splitter 17 is used as the polarizing device (polarizing means) to generate the light that has the two polarized light components, which are polarized in different polarization directions, respectively. Alternatively, a non-polarizing beam splitter, which does not change the polarization directions of the polarized light components of the laser lights inputted thereto, may be used as the polarizing device (polarizing means). In such a case, the polarization direction of the laser light, which is projected from the first laser light source to the non-polarizing beam splitter, and the polarization direction of laser light, which is projected from the second laser light source, need to be changed from each other in an appropriate manner.

In the first and second embodiments, the polarization directions of the polarized light components of the laser light, which is projected from the laser scanner 10 onto the projection surface 91, do not change even when the laser light is reflected by the screen 30 and the concave mirror 40. Alternatively, an optical element(s), which changes the polarization directions of the polarized light components of the laser light, may be placed in the light path from the laser scanner 10 to the projection surface 91. In this way, the polarization directions of the polarized light components of the laser light can be freely set without a need for adjusting the orientation of, for example, the laser scanner 10 that has a relatively large size.

In the second embodiment, the polarizing filter 117d is placed on the upstream side of the upstream side glass substrate 117a of the liquid crystal cell device 117. Alternatively, the polarizing filter 117d may be placed between the liquid crystal cell device 117 and the laser light source 114a or may be provided at an output 114e of the laser light source 114a. In other words, the polarizing filter 117d may be placed at any location in a portion of the light path from the outlet 114e of the laser light source 114a to the layer 117c of the liquid crystal cell device 117, which includes the liquid crystal molecules, to block the other one of the two polarized light components outputted from the laser light source 114a. Further alternatively, the polarizing filter 117d may be eliminated from the head-up display apparatus 100, if desired. Even when the polarizing filter 117d is eliminated, the interference between the two polarized light components of the light reflected by the projection surface 91 can be limited to some extent.

In each of the above embodiments, at the laser light source 14a, 14b, 114a, the majority, i.e., more than fifty percent of the laser light outputted from the laser light source 14a, 14b, 114a is polarized in the corresponding one of the two polarized light components, and the rest of the laser light outputted from the same laser light source 14a, 14b, 114a is polarized in the polarization direction, which corresponds to the polarization direction of the other one of the two polarized light components. Alternatively, a higher percentage (e.g., more than 60, 70, 80 or 90 percent or all) of the laser light outputted from the laser light source 14a, 14b, 114a may be polarized in the corresponding one of the two polarized light components, and the rest of the laser light outputted from the same laser light source 14a, 14b, 114a may be polarized in the polarization direction, which corresponds to the polarization direction of the other one of the two polarized light components. When this percentage is increased, the loss of the laser light, which is not projected onto the projection surface 91 can be advantageously minimized.

In the first and second embodiments, the windshield 90 is used as the display member. Alternatively, the display member may be a combiner (separate member) having a projection surface. The combiner is made of a light transmissive material and is placed adjacent to, more specifically attached to an interior surface of the windshield 90 located inside of the passenger compartment of the vehicle. The combiner may be formed separately or provided separately from the windshield 90.

Additional advantages and modifications will readily occur to those skilled in the art. The present disclosure in its broader terms is therefore not limited to the specific details, representative apparatus, and illustrative examples shown and described.

What is claimed is:

1. A head-up display apparatus that projects a display image onto a projection surface of a display member, which is installed in a vehicle, to enable a viewer located in a passenger compartment of the vehicle to view a virtual image of the display image, the head-up display apparatus comprising:
 a plurality of light source devices that output coherent lights, which form the display image;
 a polarizing device that is placed in a light path of the coherent lights, which are outputted from the plurality of light source devices, wherein the polarizing device outputs only two lights, which have different polarization directions, respectively, when the polarizing device receives the coherent lights from the plurality of light source devices;
 a screen member that diffuses the two lights, which are received from the polarizing device, toward the projection surface, so that the two lights, which have the different polarization directions, respectively, are incident on the projection surface as diffused lights and form the display image on the projection surface; and
 a scanner that scans the two lights projected from the polarizing device to form the display image onto the screen member, wherein:
 the plurality of light source devices includes:
  a first light source device that projects the coherent light, which becomes one of the two lights that have the different polarization directions, respectively; and
  a second light source device that projects the coherent light, which becomes the other one of the two lights that have the different polarization directions, respectively;
 the polarizing device is a polarizing beam splitter that includes a filter, wherein the filter reflects the light entered into one surface of the filter and transmits the light entered into the one surface of the filter to another surface of the filter, and the filter reflects the light entered into the another surface of the filter and transmits the light entered into the another surface of the filter to the one surface of the filter;
 the polarizing device is arranged in the light path such that two polarization directions of the diffused lights, both of which are incident and reflected on the projection surface, are symmetrical to each other about a polarization direction of a p-polarized light, which is parallel to a plane of incidence corresponding to the diffused lights on the projection surface, and symmetrical to each other about a polarization direction of an s-polarized light, which is perpendicular to the plane of incidence; and the filter receives the coherent light outputted from the first light source device at the one surface of the filter and receives the coherent light outputted from the second light source device at the another one surface of the filter, and the filter combines a portion of the coherent light of the first light source device, which is reflected by the one surface of the filter, with a portion of the coherent light of the second light source device, which enters into the another surface of the filter and is transmitted to the one surface of the filter, so that the portion of the coherent light of the first light source device, which is reflected by the one surface of the filter, and the portion of the coherent light of the second light source device, which is transmitted to the one surface of the filter, are projected as the two lights, which have the different polarization directions, respectively.

2. The head-up display apparatus according to claim 1, wherein each of the one surface and the another surface of the filter reflects a corresponding one of an s-polarized light and a p-polarized light of the entered lights and transmits the other one of the s-polarized light and the p-polarized light of the entered lights.

3. The head-up display apparatus according to claim 1, where the polarization directions of the two lights, which are projected by the polarizing device, are perpendicular to each other.

4. A head-up display apparatus that projects a display image onto a projection surface of a display member, which is installed in a vehicle, to enable a viewer located in a passenger compartment of the vehicle to view a virtual image of the display image, the head-up display apparatus comprising:

a light source device that outputs a coherent light, which form the display image;

a polarizing device that is placed in a light path of the coherent light, which is outputted from the light source device, wherein the polarizing device outputs only two lights, which have different polarization directions, respectively, when the polarizing device receives the coherent light from the light source device;

a screen member that diffuses the two lights, which are received from the polarizing device, toward the projection surface, so that the two lights, which have the different polarization directions, respectively, are incident on the projection surface as diffused lights and form the display image on the projection surface; and a scanner that scans the two lights projected from the polarizing device to form the display image onto the screen member, wherein:

the light source device is one light source device, which outputs the coherent light that has a predetermined polarization direction;

the polarizing device is a liquid crystal cell device, which changes an orientation of a plurality of crystal molecules of the liquid crystal cell device by switching between energization and deenergization of the liquid crystal cell device to change a polarization direction of the light transmitted through the liquid crystal cell device;

the polarizing device is arranged in the light path such that two polarization directions of the diffused lights, both of which are incident and reflected on the projection surface, are symmetrical to each other about a polarization direction of a p-polarized light, which is parallel to a plane of incidence corresponding to the diffused lights on the projection surface, and symmetrical to each other about a polarization direction of an s-polarized light, which is perpendicular to the plane of incidence; and the head-up display apparatus further comprises a controller that alternately and repeatedly executes the energization and the deenergization of the liquid crystal cell device at predetermined time intervals.

5. The head-up display apparatus according to claim 4, where the polarization directions of the two lights, which are projected by the polarizing device, are perpendicular to each other.

* * * * *